(12) United States Patent
Pelo (10) Patent No.: US 7,594,292 B1
(45) Date of Patent: *Sep. 29, 2009

(54) ESPRESSO MACHINE CLEANING TOOL

(75) Inventor: Jeffrey Matthew Pelo, P.O. Box 2423, Mill Valley, CA (US) 94942

(73) Assignee: Jeffrey Matthew Pelo, Mill Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/210,441

(22) Filed: Sep. 15, 2008

Related U.S. Application Data

(62) Division of application No. 10/942,176, filed on Sep. 15, 2004, now Pat. No. 7,437,792.

(60) Provisional application No. 60/513,417, filed on Oct. 21, 2003.

(51) Int. Cl.
*A46B 15/00* (2006.01)
(52) U.S. Cl. .............. 15/106; 15/105; 15/111; 15/160; 15/176.2; 15/176.4; 15/248.1; D4/116; D4/119; D4/127
(58) Field of Classification Search ............ 15/105, 15/106, 111, 113, 160, 167.1, 167.3, 176.1, 15/176.2, 176.4, 176.5, 194, 202, 248.1; 132/309; D4/108, 111, 116, 118, 119, 127
See application file for complete search history.

(56) References Cited

U.S. PATENT DOCUMENTS

| 497,722 | A | | 5/1893 | Kellogg |
| 500,719 | A | | 7/1893 | Palmer |
| 1,063,523 | A | * | 6/1913 | Farrar ................. 15/167.1 |
| 1,121,082 | A | | 12/1914 | Farrar |
| 1,271,252 | A | | 7/1918 | Wilson |
| 1,852,480 | A | | 4/1932 | Ruetz |
| 1,889,495 | A | * | 11/1932 | Priest ................. 15/167.1 |
| 1,913,990 | A | * | 6/1933 | Levin ................. 15/167.1 |
| 1,990,619 | A | | 2/1935 | Schumann |

(Continued)

FOREIGN PATENT DOCUMENTS

DE 2752118 A 5/1979

(Continued)

OTHER PUBLICATIONS

Caffe Culture Magazine; A photo from the magazine showing the relevant brushes in the lower right portion; www.compact-designs.com; 1 page.

(Continued)

*Primary Examiner*—Mark Spisich (57) ABSTRACT

An apparatus for cleaning an espresso machine includes a brush head attached to a neck. The brush head includes a longitudinal axis that is perpendicular to that of the neck. The neck extends along a first longitudinal axis for a length and is attached to a handle section that includes a second longitudinal axis which extends away from the brush head at a greater angle than the neck. A plurality of annular rings prevents scalding water from traversing past the neck and reaching the handle section, where a user is adapted to grasp the apparatus. A protrusion is included, as desired, to clean the orifice of a steamer wand. Various possible enhancements include ergonomic grip surfaces on the handle section, replacement component parts, and dual cleaning surfaces.

15 Claims, 5 Drawing Sheets

U.S. PATENT DOCUMENTS

| | | |
|---|---|---|
| 2,028,519 A | 1/1936 | Peterkin et al. |
| 2,080,605 A | 5/1937 | Duey |
| 2,208,013 A | 7/1940 | Baker |
| 2,241,584 A | 5/1941 | Cohen |
| 2,722,703 A | 11/1955 | Green |
| 2,857,608 A | 10/1958 | Schwartz |
| D201,350 S | 6/1965 | Taylor |
| 3,589,823 A | 6/1971 | Hendrickson |
| 4,150,457 A * | 4/1979 | Larson ................ 15/106 |
| 4,167,796 A | 9/1979 | De Pamphilis |
| 4,274,174 A | 6/1981 | Ertel |
| 4,399,582 A | 8/1983 | Ernest et al. |
| 4,517,701 A * | 5/1985 | Stanford, Jr. ........... 15/106 |
| 4,679,272 A | 7/1987 | Florence |
| 4,731,896 A * | 3/1988 | de La Tour ........... 15/106 |
| 4,738,001 A | 4/1988 | Shipp |
| 4,882,803 A | 11/1989 | Rogers et al. |
| 4,911,187 A | 3/1990 | Castillo |
| 5,660,546 A | 8/1997 | Shafer |
| 6,105,195 A | 8/2000 | Davis |
| 2005/0210611 A1 | 9/2005 | Pelo |

FOREIGN PATENT DOCUMENTS

| | | |
|---|---|---|
| EP | 1525832 A1 | 4/2005 |
| WO | 9107114 A1 | 5/1991 |
| WO | 9965359 A1 | 12/1999 |
| WO | 0152696 A1 | 7/2001 |

OTHER PUBLICATIONS

Barista Magazine, vol. 2, Issue 3; pictures of Group Head Brushes—Zig Zag and Drip Guard—2 pgs.—www.espressosupply.com.

WWW.URNEX.COM; Scoopz Espresso Brush; 1 page.

* cited by examiner

ESPRESSO MACHINE CLEANING TOOL

CROSS-REFERENCE TO RELATED APPLICATIONS

This Application is a Divisional of U.S. application Ser. No. 10/942,176 filed Sep. 15, 2004 now U.S. Pat. No. 7,437,792 B2 issued on Oct. 21, 2008, to Jeffrey M. Pelo, entitled "Espresso Machine Cleaning Tool,"; which claims the benefit of priority date of Provisional Patent Application Ser. No. 60/513,417 that was filed on Oct. 21, 2003 by Jeffrey M. Pelo entitled, "Espresso Machine Cleaning Tool"; commonly assigned with the present invention and incorporated herein by reference.

BACKGROUND OF THE INVENTION

1. Field of the Invention

The present invention, in general, relates to cleaning devices and, more particularly, to a hand-held tool for cleaning an espresso machine.

Espresso machines are currently well known types of devices that are used to create espresso beverages. The process of creating an espresso beverage is often referred to as "brewing", although technically brewing is not a precise term. The word "espresso", according to Webster, means, "to press out, express" and the process, again according to Webster, involves the use of steam. As these differences are not critical to an understanding of the instant invention, the term "brew" or "brewing" is used herein to indicate whenever an espresso beverage is created.

An espresso beverage includes an aqueous extract of the coffee bean. The beverages are, of course, consumed by people. Therefore, frequent and periodic cleaning of the espresso machine is required. This is true if the espresso machine is individually owned and it is especially true for commercial espresso machines.

Commercial coffee houses, for example, which are the primary users of commercial types of espresso machines, must follow a strict regimen of cleaning their espresso machines. Failure to do so can, at best, impede the proper functioning of the espresso machine and, at worst, can foster the growth of bacteria which could be harmful to the consumer. On a less severe, yet especially practical level, an unclean espresso machine may include an oily coffee related residue that can have a deleterious effect on the taste of any created (i.e., brewed) espresso beverage. The espresso beverage derived from a clean espresso machine simply tastes better.

The cleaning regimen typically requires the use of a precise amount of powdered espresso machine detergent, which is specifically made for that purpose.

However, several problems currently exist that affect the cleaning of espresso machines, commercial and privately owned. As an example, people in commercial coffee houses do not typically accurately measure the proper amount of detergent that is required.

A variable quantity of detergent is obtained and inserted into the espresso machine. As a result, either too little detergent is often used and the espresso machine is not adequately cleaned or too much detergent is often used, which causes waste. If too much detergent is used, the excess may tend to precipitate out of the solution and leave a residue that can affect the taste of the next several espresso beverages brewed. Worse yet, the residue can be transferred to the brewed espresso beverage where it, subsequently, will be ingested. Accordingly, a need to measure a proper quantity of detergent is required.

Also, the current prior art cleaning devices include "all-purpose" types of brushes that leave much to be desired.

Prior art brushes are unable to clean the small orifice in the "steamer wand" conduit. The small orifice is difficult to clean. Furthermore, anything that is used to clean such an orifice is subject, as well, to wear and breakage, and it is desirable to be able to replace a worn part of an optimally designed cleaning tool.

Similarly, commercial espresso machines include "group heads" that are accessible for cleaning after a "portafilter", as is well known in the espresso machine arts, has been removed. Prior art brushes are ineffective at cleaning group heads for a variety of reasons. The angle and location of a cleaning head of a brush with respect to a handle is not ideal for a user to optimally clean the group heads.

Also, hot, scalding water tends to scald the hand of the user. This has been a previously unsolvable problem because it is necessary to access parts of the espresso machine from an elevation that is below certain of the components that are to be cleaned (i.e., the group heads). Accordingly, the handle or prior art devices must angle downward. Capillary action encourages the hot water that is flowing through the espresso machine to traverse the length of prior art cleaning brushes and scald the user.

This is a liability issue for commercial coffee houses, as well as a deterrent that encourages the user to accomplish a less than diligent cleaning effort of the espresso machine, less the user be burned in the process of attempting to clean the machine properly.

Optimum bristle placement and length are not provided by the prior art devices. Similarly, the prior art devices do not allow for user selection of these important variables. For example, one brand of espresso machine may best be cleaned by a particular length and type of bristle that is not as effective when it is used to clean another brand (i.e., another type) of espresso machine.

Also, the bristles tend to wear out periodically and prior art brushes do not allow replacement. Rather, the entire brush must be discarded and replaced when the bristles wear.

For some cleaning applications, these desired improvements and benefits are more desirable when they are available in a less-expensive disposable type of a device. For example, a homeowner who seldom uses and cleans his espresso machine may still want the benefit of an espresso machine cleaning device that prevents scalding but does not necessarily need the benefit of replaceable parts for his cleaning device because it is unlikely that any cleaning device part will need replacement during the useful life of the espresso machine itself.

Accordingly, there exists today a need for an espresso machine cleaning tool that helps ameliorate the above-mentioned problems and difficulties.

Clearly, such an apparatus would be a useful and desirable device.

2. Description of Prior Art

General purpose cleaning brushes are, in general, known. Any hardware or home supply store has a selection from which to choose. While the structural arrangements of the above-described devices may, at first appearance, have similarities with the present invention, they differ in material respects. These differences, which will be described in more detail hereinafter, are essential for the effective use of the invention and which admit of the advantages that are not available with the know prior devices.

SUMMARY OF THE INVENTION

It is an object of the present invention to provide an espresso machine cleaning tool that is effective at cleaning an espresso machine.

It is also an important object of the invention to provide an espresso machine cleaning tool that is adapted to clean various component parts of an espresso machine.

Another object of the invention is to provide an espresso machine cleaning tool that is held in a hand of a user.

Still another object of the invention is to provide an espresso machine cleaning tool that prevents capillary action from conveying a fluid from a head of the tool to a handle portion of the tool where it might injure a user.

Still yet another object of the invention is to provide an espresso machine cleaning tool that prevents capillary action from conveying a hot fluid from a head of the tool to a handle portion of the tool where it might scald a user.

Yet another important object of the invention is to provide an espresso machine cleaning tool that includes at least one annular ring disposed along a neck of the tool, whereby the annular ring reduces an amount of fluid that is adapted to traverse an exterior length of the neck and reach a handle portion.

Still yet another important object of the invention is to provide an espresso machine cleaning tool that includes a replaceable brush.

A first continuing object of the invention is to provide an espresso machine cleaning tool that includes a measuring scoop attached thereto.

A second continuing object of the invention is to provide an espresso machine cleaning tool that includes a first brush disposed on one side of a neck and a second brush disposed on an opposite side of the neck.

A third continuing object of the invention is to provide an espresso machine cleaning tool that includes a first cleaning surface disposed on one side of a neck and a second cleaning surface disposed on an opposite side of the neck.

A fourth continuing object of the invention is to provide an espresso machine cleaning tool that includes a longitudinal neck portion and a longitudinal handle portion and wherein an intermediate angle therebetween is acute.

A fifth continuing object of the invention is to provide an espresso machine cleaning tool that can itself be cleaned by conventional methods including placement of the tool in a dishwasher.

A sixth continuing object of the invention is to provide an espresso machine cleaning tool that includes a protrusion for cleaning a steamer wand orifice.

Briefly, an espresso machine cleaning tool that is constructed in accordance with the principles of the present invention has a handle that is used to grasp the tool and a neck that is attached at one end thereof to one end of the handle. An opposite end of the neck includes a brush head. A plurality of bristles are attached to the brush head. The neck includes a first longitudinal axis and the handle section includes a second longitudinal axis. An acute angle is formed intermediate the first and second longitudinal axes. A plurality of annular rings prevents hot water from traversing along the neck and eventually reaching the handle section. A protrusion that is used to clean the orifice of a steamer wand extends from the tool, where desired. Ergonomic grip surfaces for use on the handle, replacement component parts, and dual cleaning surfaces are also described.

DETAILED DESCRIPTION

Figure 1:
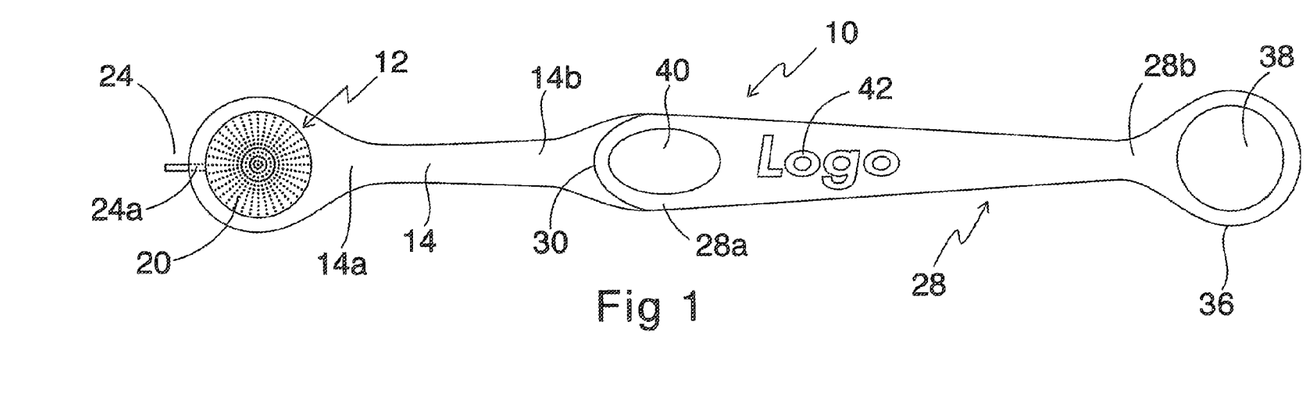
FIG. 1 is a top plan view of an espresso machine cleaning tool.
Figure 2:
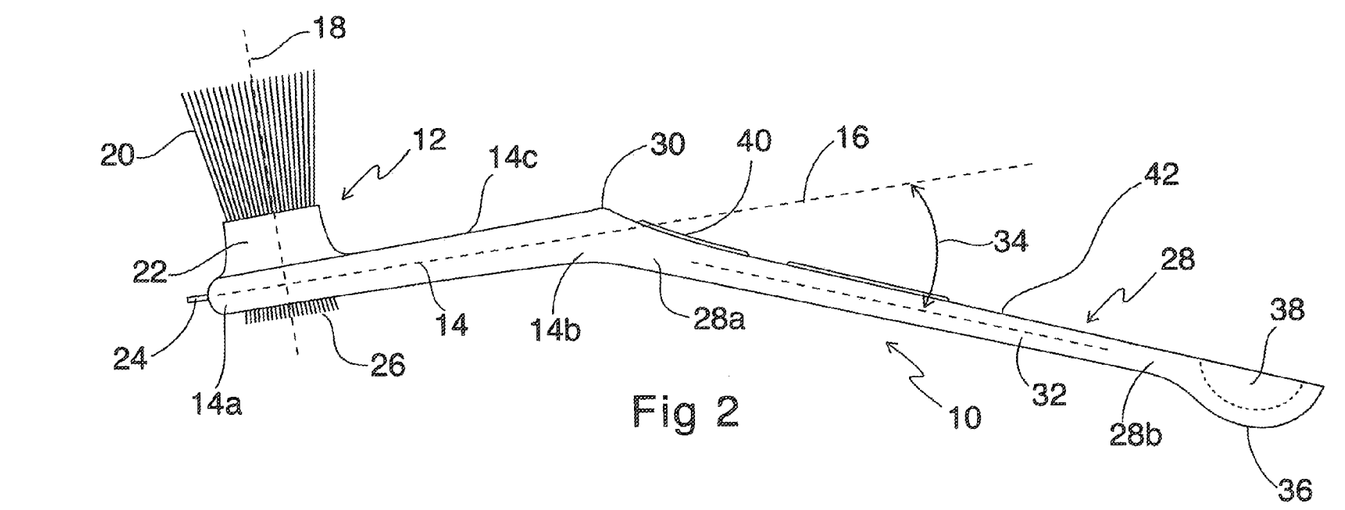
FIG. 2 is a side view of the espresso machine cleaning tool as shown in FIG. 1 as seen along the lines 2-2 therein.

Referring to all of the drawings and now in particular to both FIG. 1 and FIG. 2 is shown, an espresso machine cleaning tool, identified in general by the reference numeral 10.

Any of the component parts of the espresso machine cleaning tool 10 are formed of any desired material including, but not limited to, machined or molded plastic, wood, metal, composite materials, combinations thereof, etc. The material used for any component part is a design variable that is selected to optimally satisfy the requirements of any particular embodiment of the espresso machine cleaning tool 10.

A brush head, identified in general by the reference numeral 12, is attached to a neck 14 of the espresso machine cleaning tool 10 at a first end of the neck 14a.

The neck 14 includes a first longitudinal axis 16 that passes through a center thereof. The brush head 12 includes a longitudinal axis 18 passing through a center thereof. The longitudinal axis 18 of the brush head 12 is preferably perpendicular with respect to the first longitudinal axis 16 of the neck 14.

A plurality of bristles 20 extend away from the neck 14 in a direction that is parallel with, or nearly parallel to, the longitudinal axis 18 and away from a top surface 14c of the neck 14. Typically, the bristles extend about one inch from the top surface 14c, although any preferred length is possible.

The bristles 20 are held together by a ferrule 22 that encircles them. Alternately, the bristles 20 are molded, for example in a plastic surround, disposed within the ferrule 22. See also FIG. 3 which shows the bristles 20 molded in place. The term "ferrule", as used herein, applies to any component or part that encircles another.

The bristles 20 include any preferred material, for example, either nylon or brass or other material, and they may be as stiff or as soft as desired. When an especially frequent espresso machine cleaning regimen is utilized, the residue on the espresso machines will likely be minimal and easy to remove. Softer bristles 20 may then be preferred.

Conversely, when the cleaning regimen is further spaced apart, stiffer bristles 20 may be preferred. Also, when infrequently cleaning certain parts of an espresso machine (not shown), perhaps those that require disassembly prior to their access, stiffer types of the bristles 20 may be preferred.

The espresso machine cleaning tool 10 (this embodiment) is a unitary device that does not generally include replaceable parts. Accordingly, the bristles 20 of the standard tool 10 are expected to include a type of material and length that is sufficient to meet most needs. Various versions of the tool 10 can be offered for sale with different types, length, and materials used for the bristles 20 or any other component part thereof, as desired.

A protrusion 24 extends away from the first end 14a of the neck 14 and is generally in alignment with the first longitudinal axis 16. The protrusion 24 is secured to the first end 14a of the neck 14 by any preferred method. A common method is to mold the protrusion 24 in the first end 14a. Alternately, the protrusion 24 is forced into a protrusion hole 24a (FIG. 1) that is provided in the first end 14a. According to a modification, an end of the protrusion 24 that is inserted into the protrusion hole 24a may include screw threads, thereby firmly securing it to the espresso machine cleaning tool 10 and also allowing replacement, if necessary. The protrusion 24 preferably includes a rounded, somewhat blunt end, although a pointed end may be used, if desired. The protrusion 24 can, of course, be molded as an integral part of the tool 10, as desired.

A bottom cleaning surface 26 is provided on a side opposite that of the bristles 20. The bottom cleaning surface 26 may include shorter length bristles, or any type of a scrubbing pad, abrasive surface, etc., that is desired. It is also possible that the bristles 20 can extend through the brush head 12 and the first neck end 14a sufficient to protrude from the first neck end 14a at a side opposite that of the bristles 20.

The bottom cleaning surface 26, in general, is useful for when a more resistant cleaning situation is encountered. For example, the scrubbing pad or abrasive surface is useful at removing stubborn residue from the espresso machine.

Similarly, if the bristles 20 are allowed to extend through the espresso machine cleaning tool 10, the bottom cleaning surface 26 portions are considerably shorter in length. The shorter portions can accept greater levels of pressure being applied to them and are also useful in cleaning stubborn areas.

The neck 14 includes a second end 14b that is distally disposed with respect to the first end 14a. A handle portion, identified in general by the reference numeral 28, includes a first handle end 28a and an opposite second handle end 28b.

The first handle end 28a is attached to the second end 14b of the neck 14 at a junction 30. The handle 28 includes a second longitudinal axis 32 passing through a center thereof. An acute angle 34 is formed intermediate the first longitudinal axis 16 and the second longitudinal axis 32 wherein, as the handle 28 extends further away from the neck 14, the distance intermediate the first longitudinal axis 16 and the second longitudinal axis 32 increases. The acute angle 34 is preferably approximately twenty-five degrees.

This angular structure of the handle 28 with respect to the neck 14 is particularly useful in disposing a hand of a user (not shown) at a position where sufficient force can be safely applied to the bristles 20 to clean the espresso machine, as is described in greater detail hereinafter.

The acute angle 34 also allows the espresso machine cleaning tool 10 to be held under the espresso machine whereby the neck 14 is at a slightly elevated attitude so that the junction 30 is elevated above the first end 14a of the neck 14, as shown in FIG. 2. The slightly elevated attitude of the neck 14 typically prevents hot water that is flowing through the espresso machine during cleaning from traversing the length of the neck 14 and reaching the handle 28. As is described in greater detail hereinafter, the handle 28 is grasped by the user and if a sufficient quantity of hot water were to reach the handle 28 it is apt to scald the user.

A measuring scoop 36 is attached to the second handle end 28b. The scoop 36 includes a concave portion 38 that, when level, contains an optimum amount of an espresso machine cleaning detergent (not shown). Even if a somewhat diminished quantity is obtained or a somewhat greater quantity is obtained, the scoop 36 ensures that the quantity of detergent is sufficient to adequately clean most types of the espresso machine. Accordingly, the measuring scoop 36 provides means for While any size is possible, a typical overall length of the espresso machine cleaning tool 10 is from six to ten inches, with a preferable overall length of about eight inches.

The neck 14 is preferably tapered from its junction 30 where it is at its widest and it narrows until it reaches the brush head 12. The neck 14 is smaller than the first handle end 28a.

The handle 28 also includes a taper and is widest at the first handle end 28a and narrowest at the second handle end 28b.

A thumb rest 40 is preferably included at an upper surface of the handle 28 proximate the first handle end 28a. The thumb rest 40 is preferably oval in shape with a slightly concave center portion and a perimeter that is raised with respect to a remainder of the upper surface of the first handle end 28a. During use, the user places his or her thumb in the thumb rest 40, as is described in greater detail hereinafter.

A logo 42 is optionally provided on the upper surface intermediate the thumb rest and the second handle end 28b. Any other additional information, as desired, is provided in this area as well. The logo 42 can include that of the manufacturer of the espresso machine cleaning tool 10 or, alternately, the manufacturer of the espresso machine cleaning tool 10 may elect to include a logo of any commercial coffee house or of any espresso machine manufacturer, as desired.

To use the tool 10, the user grasps the tool 10 holding it along either the neck 14 or handle 28 and using the scoop 36 obtains a measured quantity of espresso machine cleaning detergent (not shown) which is placed in the espresso machine portafilter, as is well known in the espresso machine cleaning arts.

The scoop 36 provides a means that is adapted for measuring a quantity of espresso machine detergent which ensures that a proper quantity of detergent is obtained. The user then grasps the handle 28 and places his or her thumb on the thumb rest 40. This causes the bristles 20 to face upward where they can be used to bear against group heads of the espresso machine or any other part of the espresso machine that is to be cleaned.

If a stubborn stain or residue is encountered on the espresso machine, the tool is rotated about the second longitudinal axis 32 for 180 degrees and the bottom cleaning surface 26 is used to clean the stubborn area.

The protrusion 24 is used to penetrate and clean an orifice(s) (not shown) in an end of a steam wand that is common to virtually all types of espresso cleaning machines. No present type of espresso machine tool is currently available that is designed to penetrate and clean these types of orifices.

The protrusion 24 can be mounted anywhere as desired on the tool 10. However, being disposed at the first neck end 14a maximally disposes the protrusion 24 away from a distal end of the handle. Accordingly, maximum reach is provided as well as a good strong grip for the user to force the protrusion 24 into the desired orifice(s).

After cleaning the orifice, steam is typically forced through the steam wand of the espresso machine. The steam can be used to remove any debris that was dislodged by the protrusion 24 and which might otherwise remain in the wand prior to brewing any beverage for consumption.

Figure 3:
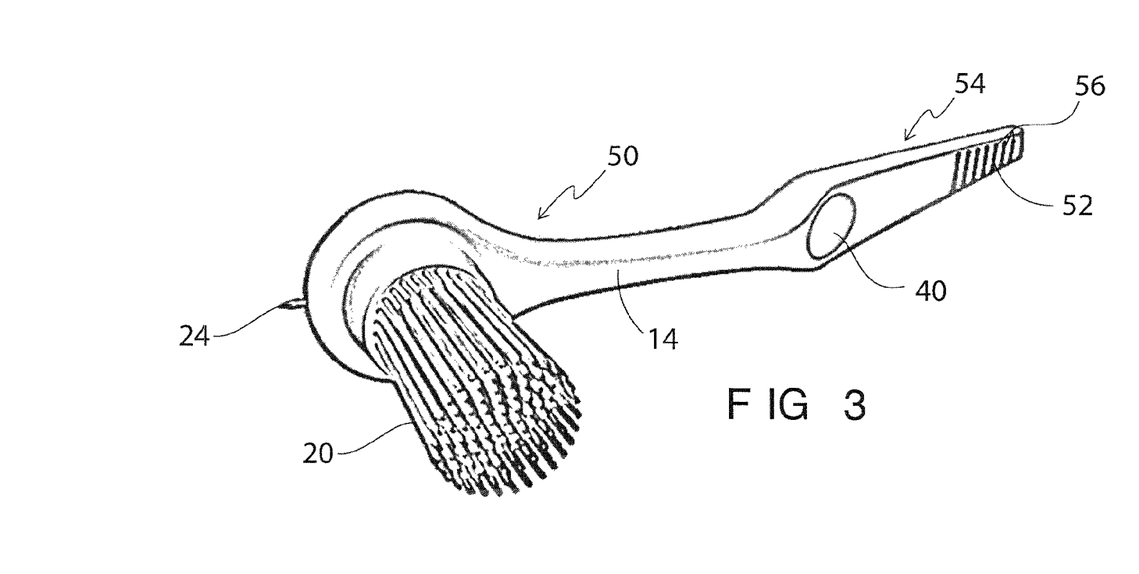
FIG. 3 is a perspective view of a first modified type of an espresso machine cleaning tool.

Referring now in particular to FIG. 3, is shown a first modified type of an espresso machine cleaning tool, identified in general by the reference numeral 50. The first modified tool 50 is similar to the espresso machine cleaning tool 10, except the scoop 36 and the logo 42 have been eliminated. A palm rest 52 is provided at a distal end of a modified handle, identified in general by the reference numeral 54. The palm rest 52 can optionally contain an embedded magnet 56 which allows the user to attach the first modified type of an espresso machine cleaning tool 50 to a metallic side of the espresso machine or other metallic surface where it is readily accessible for use.

Figure 4:
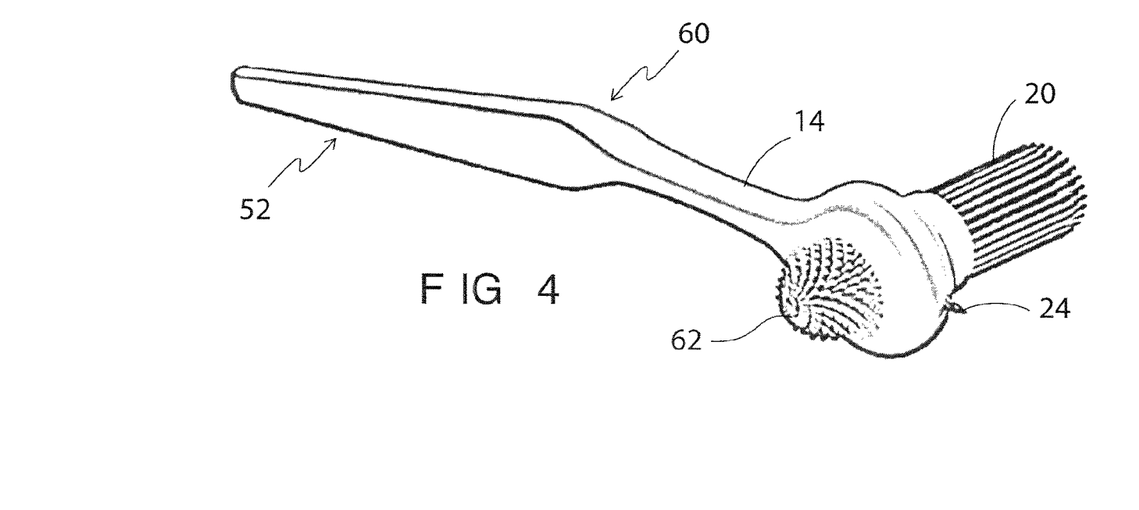
FIG. 4 is a perspective view of a second modified type of an espresso machine cleaning tool.

Referring now in particular to FIG. 4, is shown a second modified type of an espresso machine cleaning tool, identified in general by the reference numeral 60. The second modified tool 60 is similar to the first modified espresso machine cleaning tool 50, except a spherical cleaning member 62 is disposed on a side opposite the bristles 20, where the bottom cleaning surface 26 of the espresso machine cleaning tool 10 is disposed. The spherical cleaning member 62 is useful for cleaning certain types of the espresso machine.

Figure 5:
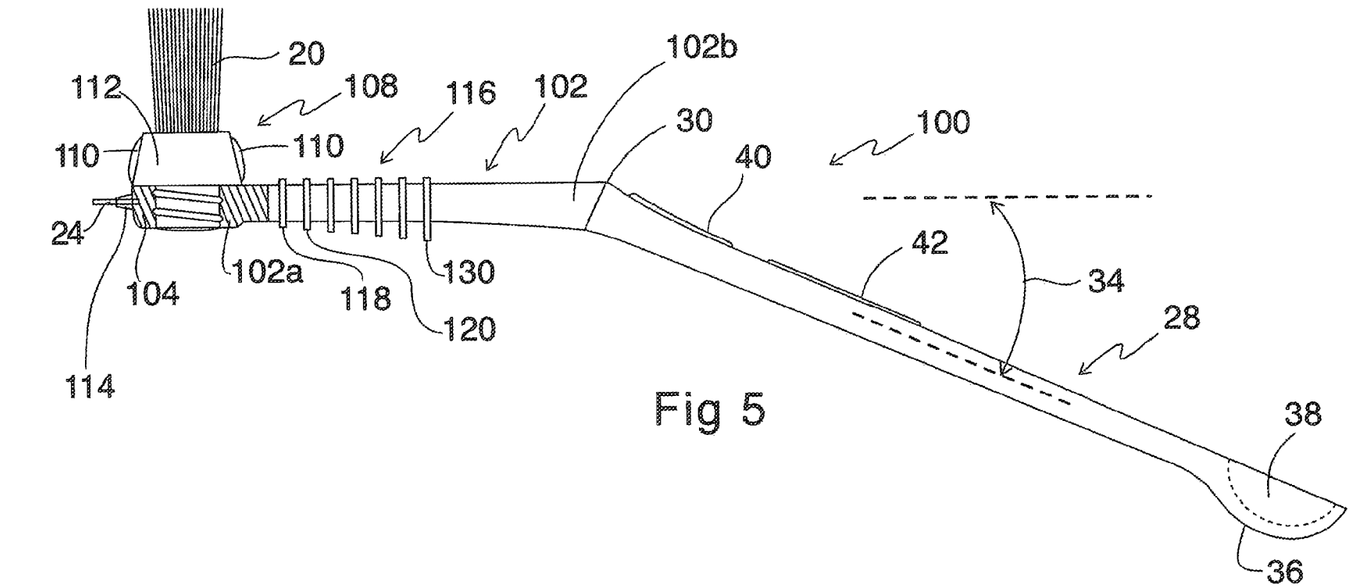
FIG. 5 is side view of a third modified type of an espresso machine cleaning tool with a removable brush head, a portion thereof being shown in cross-section.
Figure 6:
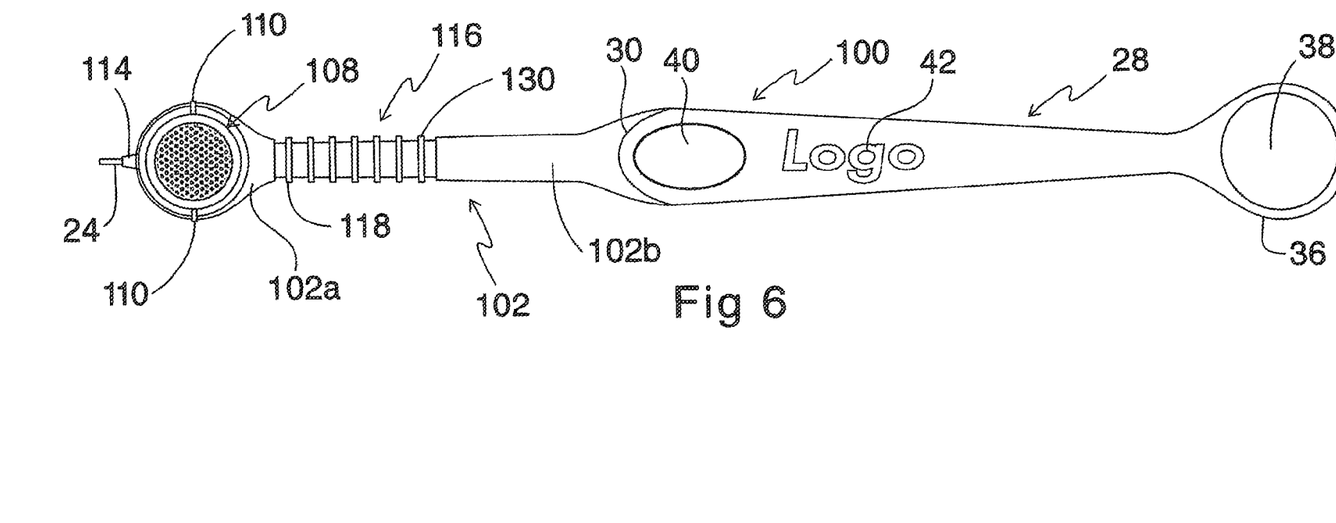
FIG. 6 is a top plan view of the third modified type of espresso machine cleaning tool that is shown in FIG. 5.
Figure 7:
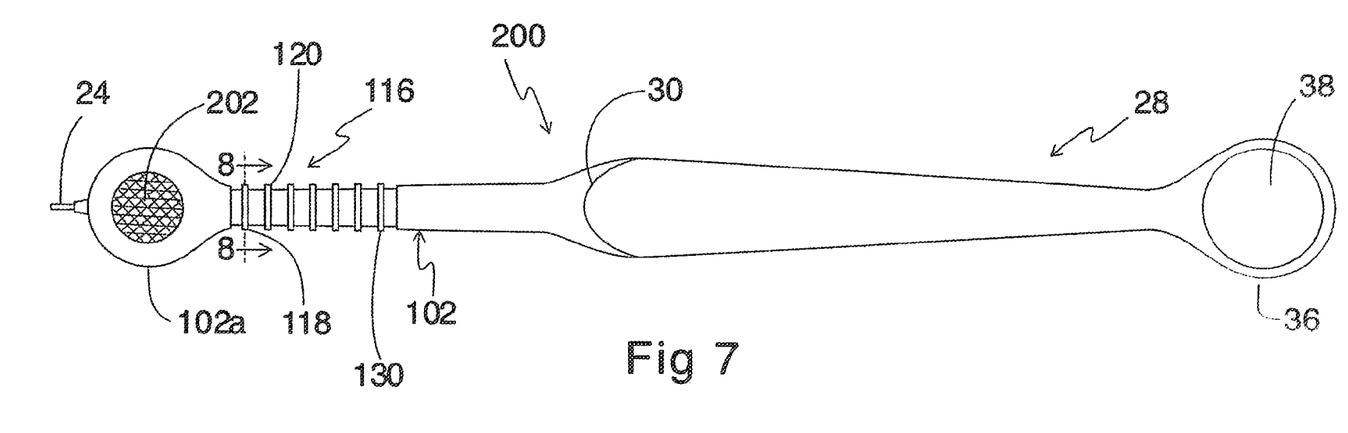
FIG. 7 is a top plan view of a fourth modified type of espresso machine cleaning tool that includes a modified cleaning surface.
Figure 8A:
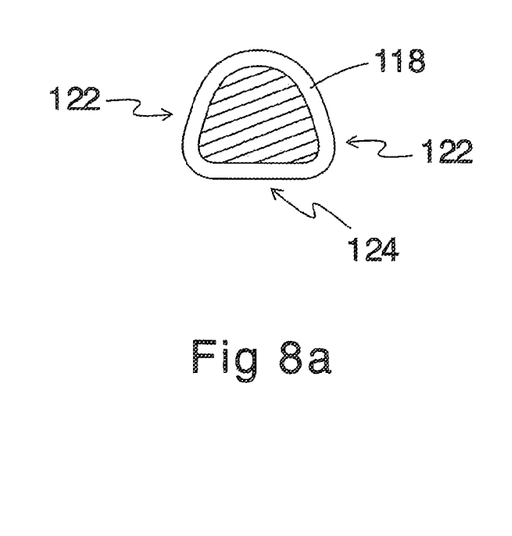
FIG. 8A is a cross-sectional view, taken along the line 8-8 of FIG. 7 of an annular ring used to deflect fluid.
Figure 8B:
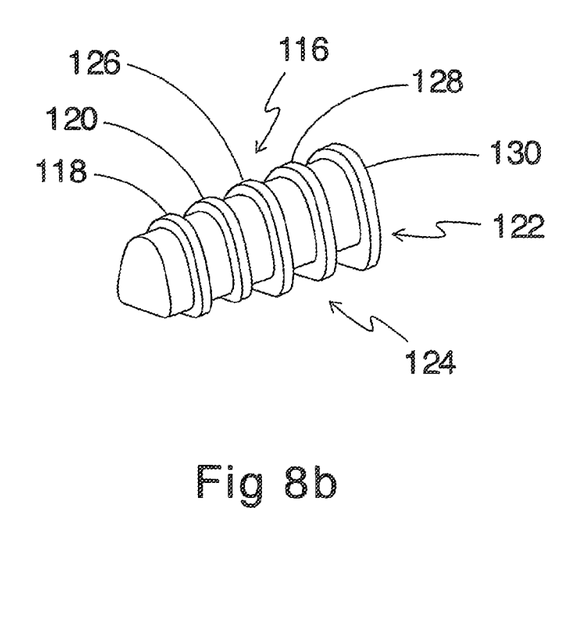
FIG. 8B is view in perspective of a section of the neck of the device of FIG. 7, showing a plurality of the annular rings.

Referring now in particular to FIGS. 5-10, is shown a third modified type of an espresso machine cleaning tool, identified in general by the reference numeral 100 (FIGS. 5, 6, 8A, 8B, 9A, 9B, and 10) and a fourth modified type of an espresso machine cleaning tool, identified in general by the reference numeral 200 in FIG. 7. Only a small difference exists between the two (100, 200) and it is useful to hold all of these drawing figures in view simultaneously of two preferred embodiments.

Referring now primarily to FIG. 5 and FIG. 6, a modified neck, identified in general by the reference numeral 102, is attached to the handle 28 at a modified neck second end 102b. The angle 34 is again preferred between the handle 28 and the modified neck 102 for the reasons mentioned hereinabove.

The modified neck 102 includes a modified neck first end 102a that is distally disposed with respect to the modified neck second end 102b. The modified neck first end 102a is shown in FIG. 5 in cross-section taken through a center thereof, as identified by cross-hatching.

The modified neck first end 102a includes an enlarged circular portion with threads 104 in a center opening thereof. The threads 104 are adapted to cooperate with corresponding threads 106 of a detachable removable brush head, identified in general by the reference numeral 108 (see FIGS. 9A, 9B).

Figure 9A:
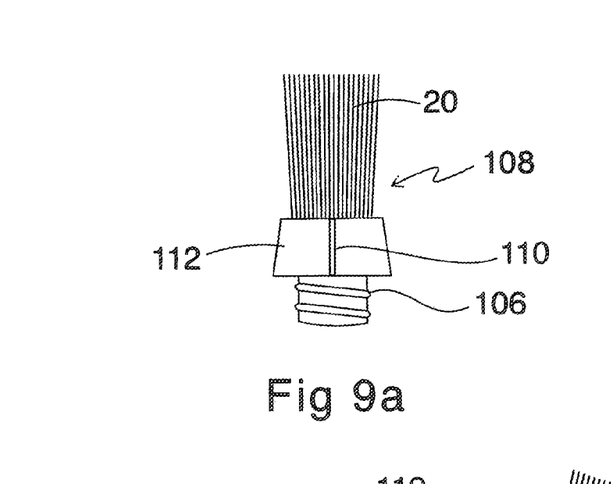
FIG. 9A is a detail view of the brush head of the device of FIG. 5, having been removed from the device.
Figure 9B:
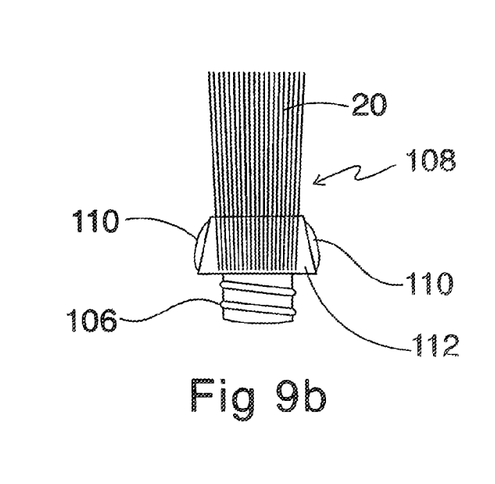
FIG. 9B is a view partially in cross-section of the brush head of FIG. 9A.

A pair of small protruding diametrically opposed tabs 110 are provided on an exterior ferrule 112 to allow grasping of the removable brush head 108 for threading it into and out of the center opening.

This allows for easy replacement of the removable brush head 108 when it wears. It also allows for an important, yet unexpected benefit. By permitting rapid exchange of various types of the removable brush head 108, different length and material types of the bristles 20 can be inserted and removed in the third modified type of an espresso machine cleaning tool 100 for virtually instant use when difficult or unusual cleaning situations arise.

Figure 10:
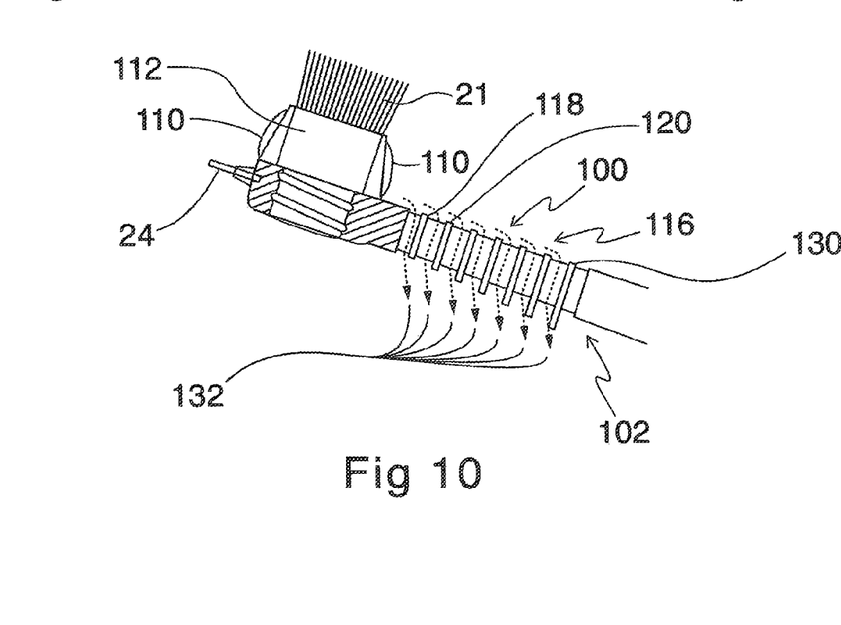
FIG. 10 is detailed side view of the device of FIG. 5, partially in cross-section, showing the lines of flow of water being deflected away from a handle portion of the device.

This allows for the use of longer bristles 20 to clean hard to reach areas as well as the use of stiffer bristles 21 (FIG. 10). The stiffer bristles 21, as shown, are shorter than the bristles 20 and are made of brass instead of nylon. Other materials are, of course, possible.

Accordingly, the third modified type of an espresso machine cleaning tool 100 provides exceptional versatility and long life and is applicable for use in the cleaning of commercial types of espresso machines as well as home espresso machines.

If desired, a ferrule support 114 is provided as part of either the protrusion 24 or the modified neck first end 102a to provide extra support for the protrusion 24. If the protrusion 24 is threaded into the modified neck first end 102a, the ferrule support 114 allows for easier grasping and turning.

Referring now to FIGS. 5, 6, 7, 8A, 8B, and 10 is shown a water deflector means, identified in general by the reference numeral 116. The water deflector 116 prevents a potential damaging amount of hot water from reaching the handle 28 portion, where it might otherwise scald the user.

Were it not for the water deflector 116, it is possible that the user might tilt the tool 100 downward during use (see FIG. 10) an amount that would also provide a downward tilt to the modified neck 102 sufficient so that capillary action would convey a quantity of hot water flowing past the bristles 20 along the modified neck 102 and to the handle 28 where is could scald the thumb (not shown) and other parts of the user's hand (not shown).

The water deflector 116 includes a first annular ring 118 proximate the modified neck first end 102a. The first annular ring 118 protrudes from the modified neck 102 and is shown in cross-section in FIG. 8A.

Water attempting to flow over the top of the modified neck 102 toward the handle 28 initially encounters the first annular ring 118. A portion of the water flows down prior to the first annular ring 118 and, if a sufficient quantity of water is present, a remainder thereof flows over the top of the first annular ring 118 and toward a second annular ring 120.

The second annular ring 120 is similar to the first annular ring 118, except the second annular ring 120 extends even further away from modified neck 102 than does the first annular ring 118 along the sides of the modified neck 102, identified in general by the reference numeral 122, and along the bottom, identified in general by the reference numeral 124.

The remaining quantity of water that reaches the second annular ring 120 and flows down prior to the second annular ring 120 and, if a sufficient remaining quantity of water is present, a further remainder thereof flows over the top of the second annular ring 120 and toward a third annular ring 126. The process is repeated, if there is additional water, along a fourth annular ring 128 and a fifth annular ring 130.

Each of the annular rings 118, 120, 126, 128, 130 increases the amount it extends away from the modified neck 102 along the sides 122 and bottom 124. The progressive increase in the size of the annular rings 118, 120, 126, 128, 130 moving away from the modified neck first end 102a effectively channels even a large quantity of water downward, prior to reaching the handle 28, as shown by arrows 132 (FIG. 10), thereby virtually eliminating any chance of scalding to the user.

The progressive increase in size of the annular rings 118, 120, 126, 128, 130 stops water from flowing along the sides 122 and bottom 124 (i.e., the underside) of the tool 100 and is effective for a small rate of water flow to a large rate of flow.

Accordingly, any water attempting to flow along the modified neck 102 encounters an increasingly difficult path as the water proceeds along the modified neck 102 toward the handle 28.

Referring momentarily back to FIG. 7, the fourth modified type of an espresso machine cleaning tool 200 is similar to the third modified type of an espresso machine cleaning tool 100 except the logo 42 and the thumb rest 40 have been omitted. Also, a modified cleaning surface 202 is shown as an exposed surface of a modified type of replaceable brush head. The modified cleaning surface 202 includes any preferred abrasive material, scouring surface, etc, that is deemed to be useful in cleaning the espresso machine.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto. For example, the various embodiments described herein can be included in any preferred combination of the tool (not shown).

What is claimed is:

1. An espresso machine cleaning tool comprising:
   a body having a brush side from which a brush extends and a back side and including a neck portion having a first end and an opposite second end, and having a brush including a first set of bristles attached at the first end and extending from the brush side, the body further having a handle portion having a first end and an opposite second end and wherein the second end of the neck portion is joined to the first end of the handle portion, and wherein the neck portion is angled toward the back side of the body to define a bend in the body where the neck portion joins the handle portion, the body further including at least one annular ring located about the neck portion and adjacent and being located nearer the brush than the bend.

2. The espresso machine cleaning tool of claim 1, further including a plurality of rings located about the neck portion and wherein the plurality of rings are positioned nearer the brush than the bend.

3. The espresso machine cleaning tool of claim 1 wherein the angle is less than one hundred-eighty degrees.

4. The espresso machine cleaning tool of claim 1 including a protrusion attached to the body and extending from the first end of the neck portion in a direction perpendicular to a direction of the brush, the protrusion adapted to enter into an orifice of an espresso machine.

5. The espresso machine cleaning tool of claim 1 wherein the body includes a scoop located on the second end of the handle portion.

6. The espresso machine cleaning tool of claim 5 wherein the scoop includes a concave portion adapted for receiving a quantity of granular material therein, and wherein the concave portion is open on the brush side of the body.

7. The espresso machine cleaning tool of claim 6 including a bottom cleaning surface disposed on the back side of the body and opposite the brush.

8. The espresso machine cleaning tool of claim 7 wherein the bottom cleaning surface includes an abrasive surface.

9. The espresso machine cleaning tool of claim 7 wherein the bottom cleaning surface includes a spherical cleaning member.

10. The espresso machine cleaning tool of claim 7 wherein the bottom cleaning surface includes a second set of bristles and wherein the second set of bristles include a shorter exposed length than the first set of bristles.

11. The espresso machine cleaning tool of claim 10 wherein the second set of bristles includes an extension of the first set of bristles through the tool.

12. The espresso machine cleaning tool of claim 1 wherein the brush is a removable brush head.

13. The espresso machine cleaning tool of claim 12 wherein the brush head includes screw threads disposed on an exterior of the brush head and the neck portion includes an opening therein having screw threads located therein and corresponding to the screw threads of the brush head.

14. The espresso machine cleaning tool of claim 13 including a ferrule, the ferrule attached to the removable brush head and wherein the ferrule is adapted to retain a quantity of bristles proximate one-another.

15. The espresso machine cleaning tool of claim 14 wherein the ferrule includes a pair of tabs that extend from diametrically opposite ends of the ferrule.

* * * * *